(12) United States Patent
John et al.

(10) Patent No.: US 8,180,722 B2
(45) Date of Patent: May 15, 2012

(54) METHOD AND APPARATUS FOR DATA MINING WITHIN COMMUNICATION SESSION INFORMATION USING AN ENTITY RELATIONSHIP MODEL

(75) Inventors: Ajita John, Holmdel, NJ (US); Reinhard P. Klemm, Basking Ridge, NJ (US); Thomas A. Petsche, Neshanic Station, NJ (US); Doree D. Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 309 days.

(21) Appl. No.: 10/955,917

(22) Filed: Sep. 30, 2004

(65) Prior Publication Data

US 2006/0085417 A1    Apr. 20, 2006

(51) Int. Cl.
   *G06F 17/00* (2006.01)

(52) U.S. Cl. ............. 706/48; 706/11; 706/12; 706/45; 706/62; 707/600; 707/607; 707/608; 707/736; 707/758; 709/201; 709/204; 709/217; 709/227; 709/250; 715/733

(58) Field of Classification Search .................. None
   See application file for complete search history.

(56) References Cited

U.S. PATENT DOCUMENTS

| | | | |
|---|---|---|---|
| 3,028,525 A | | 4/1962 | Morton |
| 5,619,555 A | | 4/1997 | Fenton et al. |
| 5,754,830 A | | 5/1998 | Butts et al. |
| 5,862,223 A | * | 1/1999 | Walker et al. ............... 705/50 |
| 5,887,136 A | | 3/1999 | Yasuda et al. |
| 5,899,995 A | * | 5/1999 | Millier et al. ............... 707/102 |
| 5,930,238 A | | 7/1999 | Nguyen |
| 6,029,195 A | | 2/2000 | Herz |
| 6,044,378 A | * | 3/2000 | Gladney ............... 707/103 R |
| 6,078,928 A | * | 6/2000 | Schnase et al. ........... 707/104.1 |
| 6,088,732 A | | 7/2000 | Smith et al. |
| 6,147,993 A | | 11/2000 | Kloth et al. |
| 6,182,133 B1 | * | 1/2001 | Horvitz ............... 709/223 |
| 6,195,657 B1 | * | 2/2001 | Rucker et al. ............... 707/5 |
| 6,321,221 B1 | * | 11/2001 | Bieganski ............... 707/5 |
| 6,321,268 B1 | | 11/2001 | Dillon et al. |
| 6,324,541 B1 | | 11/2001 | de l'Etraz et al. |
| 6,449,649 B1 | | 9/2002 | Janay et al. |

(Continued)

FOREIGN PATENT DOCUMENTS

DE    0 669 733 A2 *  8/1995

(Continued)

OTHER PUBLICATIONS

Henry Kautz et al, "Agent Amplified Communication", Proceedings of the Thirteenth National Conference, 1995.*

(Continued)

*Primary Examiner* — Hung Le

(57) ABSTRACT

Methods and apparatus are provided for analyzing user activity and for recording such user activity in an entity relationship model. A network is searched for materials associated with a user and content analysis techniques are performed on the associated materials to extract one or more characteristics from the associated materials based on predefined criteria. The extracted information is stored in an entity relationship model that relates the user to the extracted characteristics. The characteristics may include activity information, expertise information and location information. The entity relationship model can thereafter be searched to identify and optionally contact one or more users having desired characteristics.

19 Claims, 8 Drawing Sheets

U.S. PATENT DOCUMENTS

| | | | |
|---|---|---|---|
| 6,480,830 B1 | 11/2002 | Ford et al. | |
| 6,490,577 B1* | 12/2002 | Anwar | 707/3 |
| 6,526,404 B1* | 2/2003 | Slater et al. | 707/728 |
| 6,553,028 B1 | 4/2003 | Tang et al. | |
| 6,556,563 B1 | 4/2003 | Yarlagadda | |
| 6,584,472 B2* | 6/2003 | Classen | 707/104.1 |
| 6,604,129 B2 | 8/2003 | Slutsman et al. | |
| 6,633,889 B2 | 10/2003 | Dessloch et al. | |
| 6,707,471 B2 | 3/2004 | Funaki | |
| 6,760,727 B1* | 7/2004 | Schroeder et al. | 707/10 |
| 6,792,265 B1 | 9/2004 | Chan et al. | |
| 6,810,395 B1* | 10/2004 | Bharat | 707/4 |
| 6,816,850 B2* | 11/2004 | Culliss | 707/1 |
| 6,826,593 B1 | 11/2004 | Acharya et al. | |
| 6,829,585 B1* | 12/2004 | Grewal et al. | 705/7.14 |
| 6,847,959 B1* | 1/2005 | Arrouye et al. | 707/2 |
| 6,901,394 B2* | 5/2005 | Chauhan et al. | 706/60 |
| 6,915,298 B1* | 7/2005 | Cain et al. | 707/100 |
| 6,934,750 B2 | 8/2005 | Hijikata et al. | |
| 6,993,590 B1 | 1/2006 | Gauthier et al. | |
| 7,046,779 B2 | 5/2006 | Hesse | |
| 7,050,963 B2 | 5/2006 | Flavin | |
| 7,069,308 B2* | 6/2006 | Abrams | 709/218 |
| 7,076,244 B2 | 7/2006 | Lazaridis et al. | |
| 7,080,082 B2* | 7/2006 | Elder et al. | 707/100 |
| 7,103,609 B2* | 9/2006 | Elder et al. | 707/102 |
| 7,120,647 B2* | 10/2006 | Venkatesh et al. | 706/60 |
| 7,124,167 B1 | 10/2006 | Bellotti et al. | |
| 7,127,492 B1 | 10/2006 | Calo et al. | |
| 7,167,833 B2 | 1/2007 | Mashiko et al. | |
| 7,240,055 B2* | 7/2007 | Grasso et al. | 1/1 |
| 7,240,270 B2 | 7/2007 | Bellier et al. | |
| 7,249,123 B2* | 7/2007 | Elder et al. | 1/1 |
| 7,263,177 B1 | 8/2007 | Paterik et al. | |
| 7,284,002 B2* | 10/2007 | Doss et al. | 707/10 |
| 7,289,975 B2 | 10/2007 | Clarke et al. | |
| 7,305,437 B2* | 12/2007 | Horvitz et al. | 709/204 |
| 7,325,202 B2* | 1/2008 | Shirriff | 715/742 |
| 7,418,090 B2 | 8/2008 | Reding et al. | |
| 7,587,664 B2* | 9/2009 | Newbold | 715/200 |
| 7,644,144 B1* | 1/2010 | Horvitz et al. | 709/223 |
| 7,865,457 B2* | 1/2011 | Ravin et al. | 706/46 |
| 7,996,456 B2* | 8/2011 | Gross | 709/200 |
| 2002/0038331 A1 | 3/2002 | Flavin | |
| 2002/0065110 A1 | 5/2002 | Enns et al. | |
| 2002/0075304 A1 | 6/2002 | Thompson et al. | 345/751 |
| 2002/0087520 A1* | 7/2002 | Meyers | 707/3 |
| 2002/0143994 A1 | 10/2002 | Sun et al. | |
| 2002/0156787 A1 | 10/2002 | Jameson et al. | |
| 2002/0156841 A1 | 10/2002 | Landfeldt et al. | |
| 2002/0174237 A1* | 11/2002 | Shrinivasan et al. | 709/229 |
| 2002/0184373 A1 | 12/2002 | Maes | |
| 2002/0188620 A1* | 12/2002 | Doss et al. | 707/104.1 |
| 2003/0014399 A1* | 1/2003 | Hansen et al. | 707/3 |
| 2003/0014488 A1 | 1/2003 | Dalal et al. | |
| 2003/0063121 A1* | 4/2003 | Kumhyr et al. | 345/751 |
| 2003/0065955 A1* | 4/2003 | Kumhyr et al. | 713/202 |
| 2003/0070176 A1* | 4/2003 | Parker et al. | 725/105 |
| 2003/0105826 A1* | 6/2003 | Mayraz | 709/206 |
| 2003/0115089 A1* | 6/2003 | Lurie | 705/8 |
| 2003/0126205 A1* | 7/2003 | Lurie | 709/204 |
| 2003/0135606 A1* | 7/2003 | Goodwin et al. | 709/224 |
| 2003/0140037 A1* | 7/2003 | Deh-Lee | 707/3 |
| 2003/0145056 A1 | 7/2003 | Fujisawa et al. | |
| 2003/0158915 A1* | 8/2003 | Gebhart | 709/219 |
| 2003/0163520 A1 | 8/2003 | Bussani et al. | |
| 2003/0195787 A1* | 10/2003 | Brunk et al. | 705/8 |
| 2003/0204431 A1* | 10/2003 | Ingman | 705/9 |
| 2003/0225825 A1 | 12/2003 | Healey et al. | |
| 2003/0227920 A1 | 12/2003 | Benayoun et al. | |
| 2004/0034723 A1 | 2/2004 | Giroti | |
| 2004/0041902 A1 | 3/2004 | Washington | |
| 2004/0088275 A1* | 5/2004 | Elder et al. | 707/1 |
| 2004/0088303 A1* | 5/2004 | Elder et al. | 707/100 |
| 2004/0122803 A1* | 6/2004 | Dom et al. | 707/3 |
| 2004/0133571 A1* | 7/2004 | Horne et al. | 707/3 |
| 2004/0133638 A1* | 7/2004 | Doss et al. | 709/203 |
| 2004/0161090 A1* | 8/2004 | Digate et al. | 379/202.01 |
| 2004/0186852 A1 | 9/2004 | Rosen | |
| 2004/0199580 A1 | 10/2004 | Zhakov et al. | |
| 2004/0205766 A1 | 10/2004 | Lee et al. | |
| 2004/0260677 A1* | 12/2004 | Malpani et al. | 707/3 |
| 2005/0018827 A1 | 1/2005 | Himmel et al. | |
| 2005/0033657 A1* | 2/2005 | Herrington et al. | 705/26 |
| 2005/0034079 A1 | 2/2005 | Gunasekar et al. | |
| 2005/0065797 A1 | 3/2005 | Haenel | |
| 2005/0071421 A1 | 3/2005 | Calo et al. | |
| 2005/0076013 A1* | 4/2005 | Hilbert et al. | 707/3 |
| 2005/0108281 A1* | 5/2005 | Kim et al. | 707/104.1 |
| 2005/0125487 A1* | 6/2005 | O'Connor et al. | 709/201 |
| 2005/0131897 A1* | 6/2005 | Grasso et al. | 707/6 |
| 2005/0165780 A1* | 7/2005 | Omega et al. | 707/7 |
| 2005/0222987 A1* | 10/2005 | Vadon | 707/3 |
| 2005/0232166 A1 | 10/2005 | Nierhaus | |
| 2005/0270973 A1 | 12/2005 | Raev et al. | |
| 2005/0278326 A1* | 12/2005 | Horvitz et al. | 707/6 |
| 2005/0289470 A1* | 12/2005 | Pabla et al. | 715/751 |
| 2006/0029003 A1 | 2/2006 | Hassan et al. | |
| 2006/0029106 A1* | 2/2006 | Ott et al. | 370/522 |
| 2006/0044307 A1* | 3/2006 | Song | 345/419 |
| 2006/0136377 A1* | 6/2006 | Patt-Shamir et al. | 707/3 |
| 2006/0177034 A1 | 8/2006 | Reding et al. | |
| 2007/0094024 A1 | 4/2007 | Kristensson et al. | |
| 2007/0165591 A1 | 7/2007 | Higure et al. | |
| 2008/0239995 A1 | 10/2008 | Lee et al. | |

FOREIGN PATENT DOCUMENTS

| | | |
|---|---|---|
| EP | 1416696 A1 | 5/2004 |
| WO | WO 0135272 A2 * | 5/2001 |
| WO | WO 2004/044705 A | 5/2004 |
| WO | WO 2004/046875 A | 6/2004 |

OTHER PUBLICATIONS

Henry Kautz et al, "ReferralWeb: Combining Social Networks and Collaborative Filtering", Communications of the ACM, vol. 40 No. 3, Mar. 1997.*

Maarten de Laat, "Network and content analysis in an online community discourse", University of Nijmegen, 2002.*

Henry Kautz et al, "Agent Amplified Communication", in the Proceedings of the Thirteenth National Conference on Artificial Intelligence, CA, 1995.*

Micheal F. Schwartz et al, "Discovering Shared Interests Among People Using Graph Analysis of Global Electronic Mail Traffic", Department of Computer Science, University of Colorado, Oct. 1992.*

Dawit Yimam-Seid et al, "Expert Finding Systems for Organizations: Problem and Domain Analysis and the DEMOIR Approach", Journal of Organizational Computing and Electronic Commerce 13(1), 2003, p. 1-23.*

Nick Craswell et al, "P@NOPTIC Expert: Searching for Experts not just for Documents", Mathematical and Information science, 2001.*

Richard Crowder, "An Agent Based Approached to Finding Expertise", IAM Group, 2002.*

Morten Hertzum et al, "The information-seeking practices of engineers: searching for documents as well as for people", Information Processing and Management, 2000.*

Purnima Chandrasekaran et al, "An Expertise Recommender using Web Mining", FLAIRS-01 Proceedings, 2001, p. 291-294.*

Campbell et al, "Expertise Identification using Email Communications", ACM, 2003.*

Nazzaro, A, "EP Application No. 05254895 Extended Report Mar. 20, 2009", , Publisher: EPO, Published in: EP.

Nazzaro, A, "EP Application No. 05254895 Office Action Oct. 30, 2006", , Publisher: EPO, Published in: EP.

Nazzaro, Antonio, "EP Application No. 05254895 Office Action Apr. 15, 2009", , Publisher: EPO, Published in: EP.

"EP Application No. 05 254 895.5 Office Action May 19, 2008", Publisher: EPO, Published in: EP.

Nazzaro, A, "EP Application No. 05254895 Oral Prceedings", Jan. 26, 2009, Publisher: EPO, Published in: EP.

Chakraborty et al, "Extending the Reach of Business Processes", "Communications", Apr. 2004, pp. 104-106.

Hashem, Lisa, "U.S. Appl. No. 10/955,918 Office Action Oct. 6, 2008", , Publisher: USPTO, Published in: US.

Patel, Hemant Shantilal, "U.S. Appl. No. 10/955,918 Office Action Feb. 17, 2010", , Publisher: USPTO, Published in: US.

Hashem, Lisa, "U.S. Appl. No. 10/955,918, filed Jul. 10, 2009", , Publisher: USPTO, Published in: US.

NG, Christine Y., "U.S. Appl. No. 10/989,104 Office Action Nov. 28, 2008", , Publisher: USPTO, Published in: US.

NG, Christine Y., "U.S. Appl. No. 10/989,104 Office Action May 8, 2008", , Publisher: USPTO, Published in: US.

Smith, Joshua Y., "U.S. Appl. No. 10/989,105 Office Action Dec. 10, 2009", , Publisher: USPTO, Published in: US.

Smith, Joshua Y., "U.S. Appl. No. 10/989,105 Office Action Dec. 23, 2008", , Publisher: USPTO, Published in: US.

Smith, Joshua Y., "U.S. Appl. No. 10/989,105 Office Action Jan. 9, 2008", , Publisher: USPTO, Published in: US.

Smith, Joshua Y., "U.S. Appl. No. 10/989,105 Office Action Jun. 24, 2009", , Publisher: USPTO, Published in: US.

Smith, Joshua Y., "U.S. Appl. No. 10/989,105 Office Action Jul. 9, 2008", , Publisher: USPTO, Published in: US.

Smith, Joshua Y., "U.S. Appl. No. 10/989,105 Panel Decision May 25, 2010", , Publisher: USPTO, Published in: US.

Schorgg, A., "EP Application No. 05254998.7-2414 Office Action Nov. 29, 2006", , Publisher: EPO, Published in: EP.

Schorgg, A., "EP Application No. 05254998.7-2414 Office Action May 13, 2008", , Publisher: EPO, Published in: EP.

Schorgg, A., "EP Application No. 05254998.7-2414 European Search Report Feb. 7, 2006", , Publisher: EPO, Published in: EP.

Gay, Sonia L., "U.S. Appl. No. 10/979,759 Office Action Dec. 31, 2009", , Publisher: USPTO, Published in: US.

Gay, Sonia L., "U.S. Appl. No. 10/979,759 Office Action Mar. 3, 2009", , Publisher: USPTO, Published in: US.

Gay, Sonia L., "U.S. Appl. No. 10/979,759 Office Action Jul. 24, 2009", , Publisher: USPTO, Published in: US.

Gay, Sonia L., "U.S. Appl. No. 10/979,759 Office Action Jul. 6, 2010", , Publisher: USPTO, Published in: US.

Patel, Hemant Shantilal, "U.S. Appl. No. 10/955,918 Notice of Allowance Jan. 10, 2011", , Publisher: USPTO, Published in: US.

Smith, Joshua Y., "U.S. Appl. No. 10/989,105 Office Action Nov. 26, 2010", , Publisher: USPTO, Published in: US.

Smith, Joshua Y., "U.S. Appl. No. 10/989,105 Office Action Feb. 16, 2011", , Publisher: USPTO, Published in: US.

Gay, Sonia L., "U.S. Appl. No. 10/979,759 Office Action Nov. 12, 2010", , Publisher: USPTO, Published in: US.

* cited by examiner

METHOD AND APPARATUS FOR DATA MINING WITHIN COMMUNICATION SESSION INFORMATION USING AN ENTITY RELATIONSHIP MODEL

CROSS-REFERENCE TO RELATED APPLICATIONS

The present application is related to United States patent application, entitled "Method and Apparatus for Providing Communication Tasks in a Workflow," Ser. No. 10/955,918 (John), filed contemporaneously herewith and incorporated by reference herein.

FIELD OF THE INVENTION

The present invention relates generally to methods and apparatus for communicating with one or more users, and more particularly, to methods and apparatus for making communications decisions based on an entity relationship model that stores information related to a user's activities.

BACKGROUND OF THE INVENTION

Many enterprise applications must interact with human users through a variety of media. For example, applications, such as e-commerce, customer relationship management, supply chain and crisis management applications, often interact with a user using one or more of voice, electronic mail, conferencing, instant messaging or text messaging communications media.

Traditionally, developers of such enterprise applications had to integrate the applications with a variety of communication servers that implement the desired communication media. Generally, developers were required to have a thorough understanding of the complex details of the required protocols and devote a substantial part of the application development effort to the integration with communication servers. In addition, developers were required to address the convergence of communication capabilities across protocols and media, i.e., the extension of capabilities from one communication protocol and medium to others and the alignment of similar, yet incongruous capabilities across different protocols and media.

A need therefore exists for methods and apparatus for developing communications applications that bridge the communication media and communication application worlds. A further need exists for a communication application development tool that provides a high-level workflow-based programming interface that facilitates the creation and maintenance of complex communications applications.

SUMMARY OF THE INVENTION

Generally, methods and apparatus are provided for analyzing user activity and for recording such user activity in an entity relationship model. A network is searched for materials associated with a user and content analysis techniques are performed on the associated materials to extract one or more characteristics from the associated materials based on predefined criteria. The extracted information is stored in an entity relationship model that relates the user to the extracted characteristics. The characteristics may include activity information, expertise information and location information.

The entity relationship model can thereafter be searched to identify and optionally contact one or more users having desired characteristics. The entity relationship model can also be analyzed to identify patterns in communications. In addition, the entity relationship model allows real time information to be evaluated when making communications decisions.

A more complete understanding of the present invention, as well as further features and advantages of the present invention, will be obtained by reference to the following detailed description and drawings.

DETAILED DESCRIPTION

Figure 1:
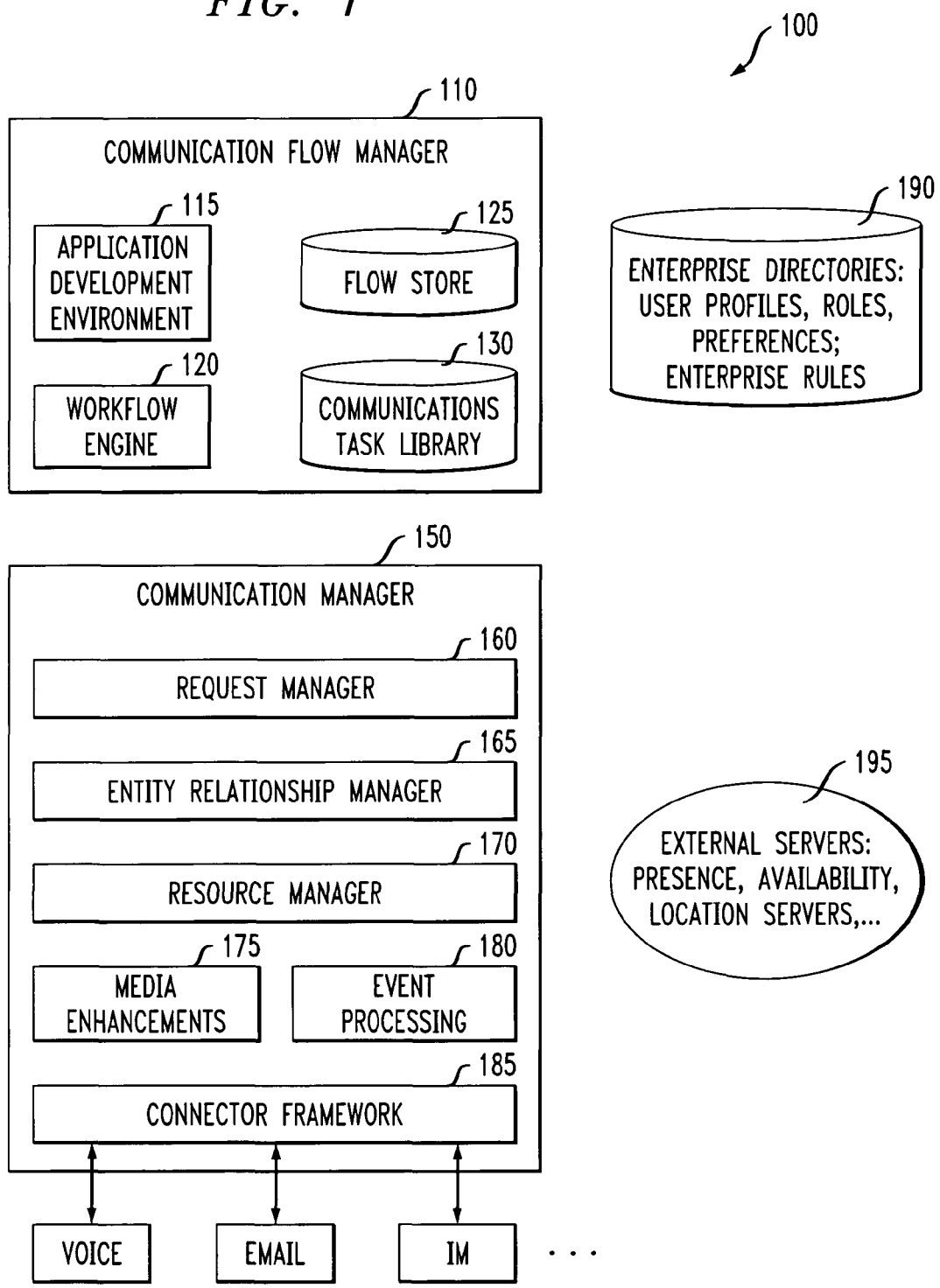
FIG. 1 is a schematic block diagram of a communication application development and application platform incorporating features of the present invention.

FIG. 1 is a schematic block diagram of a communication application development and execution platform 100 incorporating features of the present invention. The communication application development and application platform 100 provides a high-level workflow-based programming interface that facilitates the creation and maintenance of complex communications applications and it provides the execution environment necessary to run such applications. The communication application development and execution platform 100 allows an application developer to integrate an application with existing user communication services, including resource and session management, cross-connection of disparate user communication services, enhancements to the native capabilities of communication services, support for reasoning about past and present communication operations, and converged presence. As discussed hereinafter, the runtime environment of the exemplary communication application development and execution platform 100 comprises a workflow execution layer containing a set of communication-centric extensions to an existing workflow engine and a communication management layer leveraging the Java 2 Enterprise Edition (J2EE) platform.

An application may need to contact people having certain predefined characteristics, such as activities or projects they have been involved with, interests or areas of expertise. To this end, the application issues communication requests to the platform with parameters indicating the desired characteristics, as well as additional parameters, such as the time by which the application wishes people to respond to the communication request, content which to convey to these people, preferred communication media, etc. According to one aspect of the present invention, discussed, for example, in conjunction with FIGS. 5-9, an entity relationship model is disclosed that supports data mining and reasoning processes that can aid in making better, faster, more precise communication decisions. In addition, the entity relationship model can aid in detecting patterns in communications. The entity relationship model stores entities including their attributes, such as sessions, endpoints, and users, as well as current relationships between any two entities. Through entities and their relationships, the entity relationship model captures static characteristics of users, for example skills, roles, contact information, user preferences as well as dynamic information about what users are doing at this very moment (from activities to projects to usage of communication devices) and what they have been doing in the past. For example, the "participating" relationship between a user and an endpoint and between this endpoint and a session can be used to infer presence and availability of the user. If a user is participating in a session through an endpoint, this user can be considered present on this session and available for receiving and/or responding to communication requests on that endpoint. Through a proper reasoning process, this vast amount of information helps to first identify a set of potential qualified users that can satisfy a new communication request based on, for example, skills, project affiliations and past and present activities, and then to narrow down the set to include only those people who are available to satisfy the communication request within the time constraints given in the request, to choose the best communication medium with which to communicate with these people, and to choose the best content which to convey in the communication that will take place between the system and the people.

In a further variation, the communication application development and execution platform 100 may optionally provide a prioritization scheme to further reduce the set of qualified and available users to the list of one or more individuals that are actually contacted. For example, the prioritization scheme may select one or more qualified and available people based on an enhanced measure of availability (for example, using digital cameras and computer vision techniques to identify visual cues indicating that the user is actually available to handle a communication request) or corporate policies (for example, that assign the "lowest cost" user that is both qualified and available to handle a communication request).

The data stored in the entity relationship model originates from a variety of sources, for example:
  enterprise directories for static user information, such as contact information (phone numbers, email addresses, IM addresses, etc.), user roles, skills, user preferences, and more;
  enterprise rules systems that may specify enterprise policies affecting communication with and between users (examples: the communication medium to be selected for geographically dispersed users wishing to interact with each other; the limit on the number of people who may join a conference)
  the execution of communication flows feeds dynamic data about users, sessions, endpoints, etc., into the entity relationship model;
  external presence, availability servers and devices;
  external applications and systems that users use;
  an activity search engine 700, as outlined below.

An activity search engine 700 employs search techniques to identify documents and other materials created by or otherwise associated with a user. The activity search engine 700 employs content analysis techniques to extract information about the user documents, such as names of the authors, title, and content keywords. The extracted information is stored in tables associated with the entity relationship model. In this manner, a relationship is established between a user and his or her activities, projects, location or expertise. The disclosed data mining techniques can be applied to the entity relationship model, for example, to identify one or more users satisfying one or more criteria included in a query.

The communication application development part of the platform and execution platform 100 models communication applications as workflows, also referred to as flows, over application entities modeling users and communication sessions. The flows represent communication applications as compositions of task nodes, where task nodes represent units of communication activity. The model enables powerful applications, utilizing properties such as presence over groups of users and various media, to be developed easily.

Communication Applications

Figure 2:
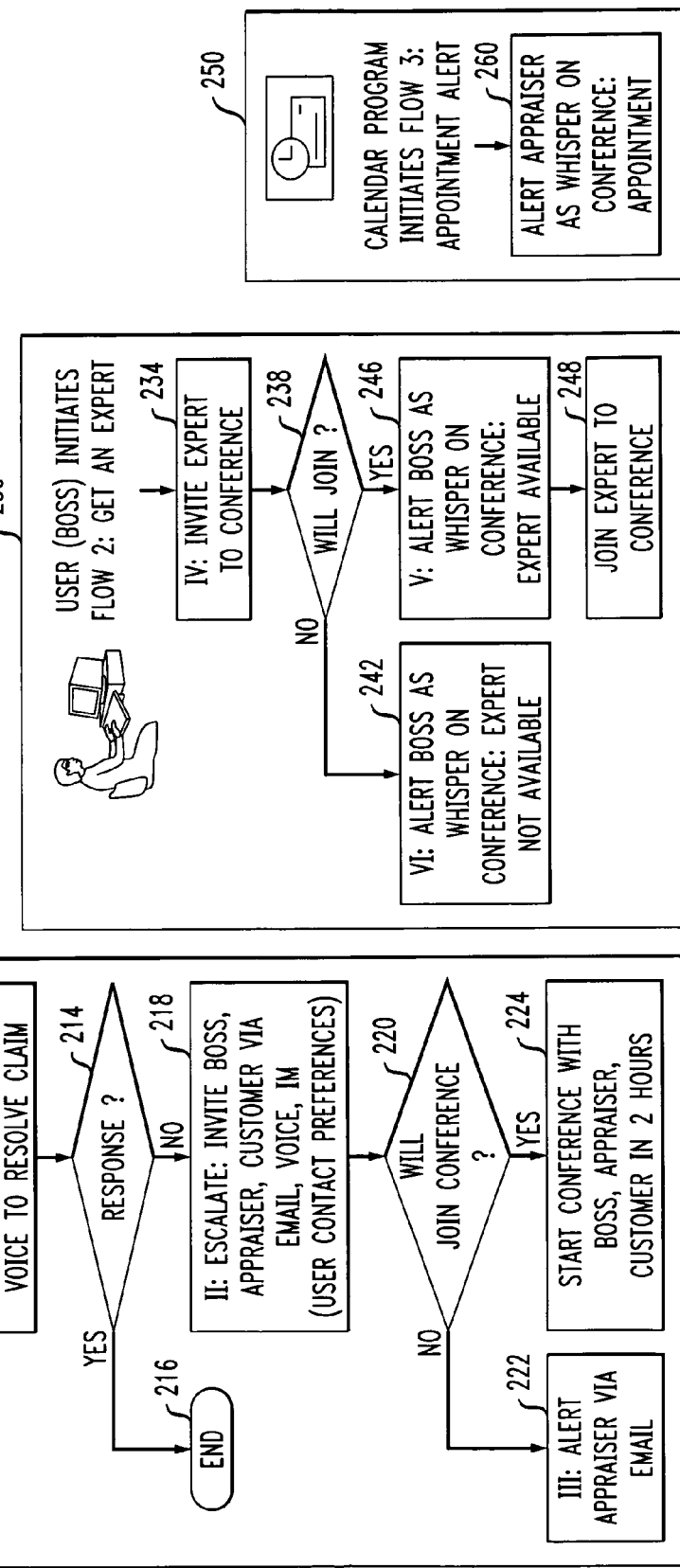
FIG. 2 illustrates an exemplary application that demonstrates the need for the present invention.

Communication applications involve interactions between communication servers, devices and people. Recently, the need for carefully orchestrated complex communication applications has increased, especially in enterprises where the need to contact and connect the right group of people at the right time, via the right communication medium, and with the right content is critical. FIG. 2 illustrates an exemplary application 200 that reflects the intricacies and complexities of today's communication needs. While the exemplary application 200 revolves around the timely resolution of an auto insurance claim by people such as a claim appraiser and an auto collision expert, other contexts, such as a hospital scenario where a resident doctor, a nurse and a specialist collaborate for consultation on a patient's health or a business context where the right set of executives need to alerted and brought into a conference when the company's stock price changes by a large amount in a short period of time could also be chosen.

The application 200 brings a group of users together to solve an issue. The issue is critical, specialized, and time-sensitive; it is imperative that the right users using different types of media and modalities (e.g. voice, IM, email) be contacted based on a combination of presence and availability information, user rules and enterprise policies, and all the other information stored in the entity relationship model. In addition, the application 200 collects responses from the users, makes decisions based on the responses and brings users into a shared environment using conferencing. The notion of presence includes all means of presence known to the application 200. These may come from disparate sources and may include presence on IM, presence on a web portal, presence on a conference, i.e., any channel that is tracked or information about which can be queried by the application.

As shown in FIG. 2, the application 200 comprises three independent processes or flows 210, 230, 250. The deadline for resolving an insurance claim is a short interval (say, 24 hours) away. A business process can detect this condition and trigger a first flow 210 to resolve the claim. In the claim resolution flow 210, a claim appraiser is first contacted during step 212 via voice in the exemplary implementation to render a menu driven voice message so that the appraiser can resolve the message immediately. The message gives brief information about the claim and states that more detailed information can be found if the appraiser logs into his user portal. If a response is received from the appraiser resolving the claim during step 214, no further action is required and the flow terminates during step 216.

If no response is received from the appraiser during step 214, the claim resolution flow 210 proceeds to escalate the problem during step 218 by sending invitations for a voice conference, to be started in say, 2 hours, to the appraiser's boss, the customer, and the appraiser. The application 200 sends the invitations using a combination of presence and availability information, user rules and enterprise policies as well as classification of the message (e.g. its importance). User rules include preferences that each user has set up in a personalized contact list that specifies how that user would like to be contacted at different times during the day. This may mean that, for instance, the boss receives the invitation via email, the appraiser via voice, and the customer via IM. The invitation can be a derived from a template that includes, for example, information about the claim and the expected duration of the conference call. The recipients of the invitation can respond by either accepting or rejecting the invitation.

Once all responses have been received by the system or a time limit has elapsed for receiving all responses, the claim resolution flow 210 checks if a minimum number of people (say, 2) have accepted the invitation during step 220. If not, the claim resolution flow 210 sends a claim resolution reminder to the appraiser during step 222 via a high priority email message. If a minimum number of people have responded in the affirmative, the claim resolution flow 210 establishes a voice conference with the three invitees at the scheduled time of the conference during step 224. This conference is named Claim Conference. The claim resolution flow 210 is completed at this point.

During the Claim Conference, the boss realizes that an auto collision expert is needed to answer some of the questions that the customer is posing. However, there are many auto collision experts in the company and the boss does not know who may be available to join the conference. The boss then initiates an expert identification flow 230, which sends out invitations during step 234 to all users that the entity relationship model identifies as auto collision experts and as available to immediately join the ongoing Claim Conference. If it is determined during step 238 that no expert responds to the invitation within a configured time limit, the boss needs to be alerted that no expert is available during step 242. The system uses presence information it has already collected that the boss is present on an ongoing conference and opts to send a "whisper" on the same audio channel that she is using for the Claim Conference. A whisper is a message rendered as speech and is audible only to the recipient, not the other conferees. If an expert responds to the invitation, the boss is alerted, during step 246, again as a whisper, that an expert is available and the expert automatically bridged into the conference. Alternatively, an IM message could be sent to alert the boss.

A third flow, referred to as an appointment alert flow 250, is initiated by the appraiser's calendar program. A previously scheduled appointment on the appraiser's calendar is about to begin and the reminder for that appointment is sent during step 260 as a whisper on the channel that the appraiser is using for the Claim Conference. As the exemplary auto insurance application 200 illustrates, communication applications have moved beyond a simple voice call or email and it is tedious and complicated to build such applications.

As previously indicated, the communication application development and execution platform 100 models communication applications using a workflow model where communication activities and decision nodes are composed in a directed graph to form a communication flow. Communication activities model high-level abstractions of communication services such as alerts, gathering responses, and conferencing. Decision nodes access the information in the entity relationship model to provide branching and looping within communication flows. In addition, specialized nodes to access external databases and suspend flows to wait for user input may also exist.

As shown in FIG. 1, the communication application development and execution platform and execution platform 100 comprises a communication flow management layer 110 and a communication management layer 150. The flow management layer 110 is responsible for the communication flows and consists of a workflow engine 120 with communication-centric extensions responsible for the execution of communication activities. The flows are compositions of services offered by the communication management layer 110. The communication management layer 150 performs the session, relationship, resource, request, and other types of management, as discussed further below in a section entitled "Communication Management Layer."

The underlying communication infrastructure encompasses a variety of communication servers, such as voice switches, email and IM servers. The platform relies on enterprise directories that store user information and enterprise policies. The platform can access additional external presence, availability, and location servers, if needed.

Communication Flow Management Layer

The communication flow management layer 110 is responsible for the creation, storage, and execution of the flows. As shown in FIG. 1, the communication flow management layer 110 comprises an application development environment (ADE) 115 that allows flows to be designed, a flow store 125 that stores the designed flows as flow specifications, a workflow engine 120 that interprets the flow specifications to execute them and a communications task library 130 that contains the modules corresponding to each type of node in the flows.

In the exemplary implementation, the application development environment 115 is based on the open source Eclipse platform and provides a palette of task nodes, each of which can be selected, dragged and dropped into a communication flow. Each selected node can be configured for communication-specific properties using the communications task library 130. The flow store 125 consists of XML representations of the flows. The workflow engine 120 executes the composition of disparate communication services as a flow. As used herein, the term flow is used instead of workflow in order to distinguish typical business processes, such as document management, from communication processes. A workflow is defined by the Workflow Management Coalition (WFMC) as "the automation of a business process, in whole or part, during which documents, information or tasks are passed from one participant to another for action, according to a set of procedural rules."

Generally, a workflow is the operational aspect of a work procedure: how are the tasks are structured, who performs them, what is their relative order, how are they synchronized, how does the information to support the tasks move and how are tasks tracked. The concept of workflows is adapted for communications by defining a communication flow to be the automation of a set of communication tasks between one or more participants according to a set of procedural rules.

The WFMC defines a workflow management system as a system that defines, creates and manages the execution of workflows through the use of software, running on one or more workflow engines, which is able to interpret the process definition, interact with workflow participants and, where required, invoke the use of IT tools and applications. Such a system consists of software components to store and interpret process definitions, create and manage workflow instances as they are executed, and control their interaction with workflow participants and applications. It also provides administrative and supervisory functions. In the communication middleware platform, the workflow management system is comprised of the workflow engine and a communication tasks library.

Communication Flows

Figure 3:
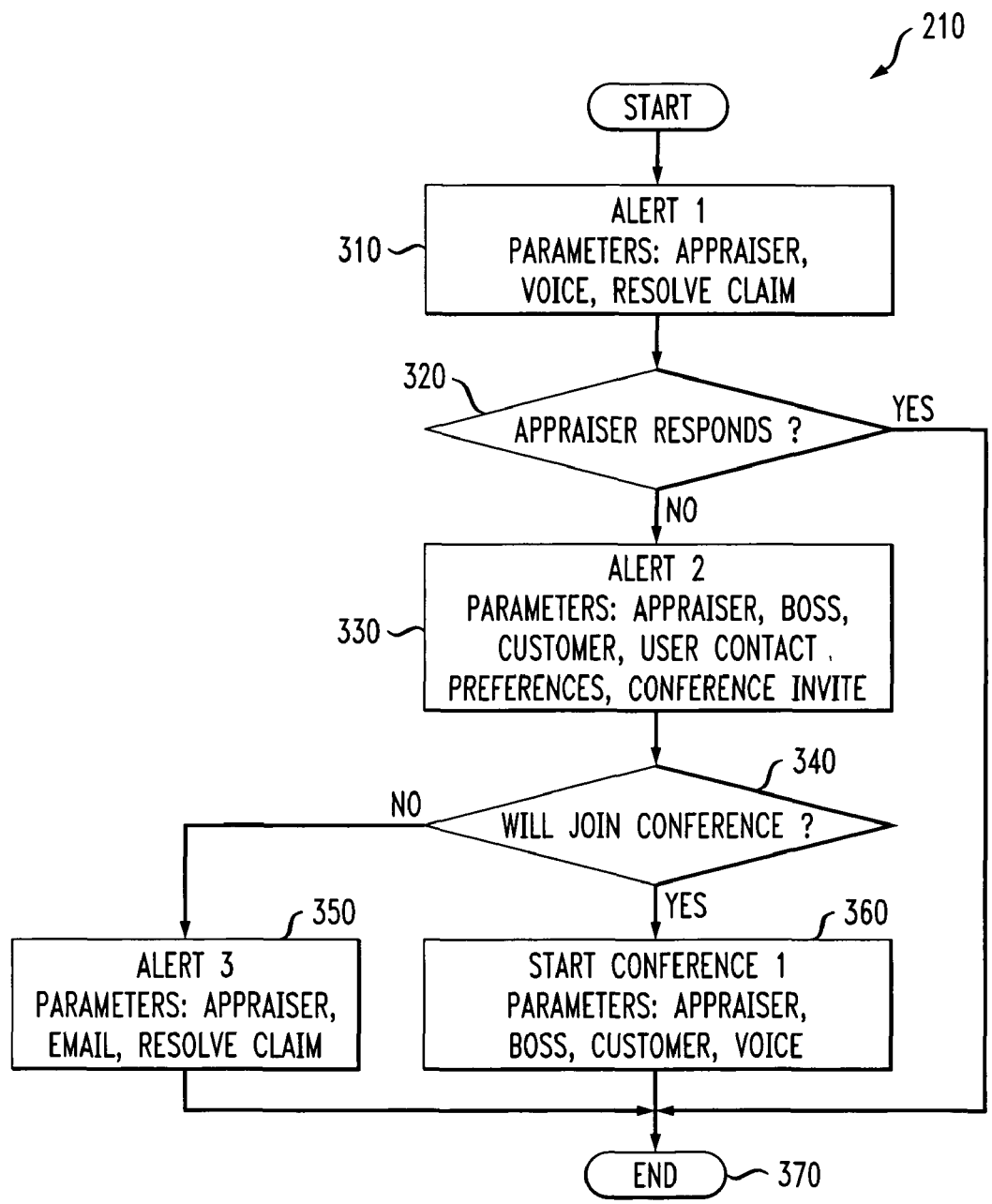
FIG. 3 is a flow chart describing an exemplary implementation of the claim resolution flow of FIG. 2 in the communication application development platform.

Communication flows are compositions of task nodes in a directed graph. FIG. 3 is a flow chart representation of the claim resolution flow 210 of FIG. 2. A shown in FIG. 3, the claim resolution flow 210 initially sends an alert to a claim appraiser during step 310. The parameters of the communication may specify that the appraiser is contacted via voice to resolve a claim. The message may give brief information about the claim and state that more detailed information can be found if the appraiser logs into his user portal. If a response is received from the appraiser resolving the claim during step 320, no further action is required and the flow terminates during step 370.

If no response is received from the appraiser during step 320, the claim resolution flow 210 proceeds to escalate the problem during step 330 by sending a second alert. The parameters of the second communication may specify that the appraiser, his or her boss and the customer are contacted in accordance with their corresponding preferences to invite them to a conference call. The invitation can be a derived from a template that includes, for example, information about the claim and the expected duration of the conference call. The recipients of the invitation can respond by either accepting or rejecting the invitation.

Once all responses have been received by the system or a time limit has elapsed for receiving all responses, the claim resolution flow 210 checks if a minimum number of people have accepted the invitation during step 340. If not, the claim resolution flow 210 sends a claim resolution reminder to the appraiser during step 350 via a high priority email message. If a minimum number of people have responded in the affirmative, the claim resolution flow 210 establishes a voice conference with the three invitees at the scheduled time of the conference during step 360. The claim resolution flow 210 is then completed at step 370.

A flow specifies the sequencing and synchronizing of communication activities in a standalone communication interaction. A set of flows defines a complete communication application and operates over a set of shared application entities such as the claim conference in the claim resolution flow 210. This allows the expert identification flow 230 in FIG. 2 to access the communication session corresponding to the claim conference that was set up by the claim resolution flow 210 and add the expert to the same claim conference.

Workflow Engine

The workflow engine 120 (FIG. 1) may be implemented in Java. The workflow engine 120 can be embodied using a commercial workflow engine with minor adaptations. Workflows are represented using a markup language that is usually a derivative of XML, such as the Business Process Execution Language (BPEL). The communication flows can be stored in XML. The workflow engine 120 is capable of interpreting flow specifications and executing them. The workflow engine 120 is agnostic to the tasks in the flow. In addition, the workflow engine 120 provides administrative functions to manage flows and interfaces to invoke them.

Communication Application Entities

Communication application entities are variables in a flow that store state. For each entity, there is a set of named attributes that store values for properties of the entity. Communication application entities and their attributes are associated with specific communication applications (sets of flows). For example, for the exemplary auto insurance application 200 in FIG. 2, some of the attributes for the appraiser may include unique handle; response to alert 1; presence on IM and presence on claim conference.

There are two types of communication application entities: users and communication sessions. Application entities have runtime representations in the entity relationship model and design time representations in the application development environment. An example of a communication session entity is a voice conference. Some of the attributes for a conference include session identifier that uniquely identifies the session; descriptive name of the conference; invitees to the conference; host of the conference; participants in the conference (may be different from invitees if everyone in the invitee list does not join the conference); start time of the conference; end time of the conference; and privileges for the participants.

The exemplary auto insurance application 200 requires four user entities: appraiser, boss, customer, and expert and one communication session entity: claim conference.

Application entities are coupled to the task nodes in a flow by being associated with the properties of the task node. For instance, the list of recipients of alert 2 in FIG. 2 (step 218) is appraiser, boss, and customer. A task node may change the state of an application entity by changing the value of an attribute in the application entity. For example, alert 2 in FIG. 2 may change the response attributes of the appraiser, boss, and customer if these users have responded to the alert. Task nodes may also access the values for the attributes in application entities. The decision node after the node for alert 2 checks the value of these attributes to decide whether or not to proceed to set up the voice conference. The application developer (or an administrator) has to set up the application entities before designing the flows for an application. This allows the association of the entities with the task nodes in the application as the application is being designed.

Communications Task Library

The communications task library 130 contains modules for executing the different types of nodes in the communication application development and execution platform 100. This library 130 can be extended with new types of communication tasks without changing the workflow engine 120. The tasks may access different sources of information such as the entity relationship model. The tasks communicate with the communication manager 150 for service requests, such as sending an email or an IM message. Support for a new task can be incorporated by adding the modules corresponding to the new task to the library 130 and to the ADE 115. No change is required to the workflow engine 120.

For each task node, there is a set of properties/parameters that have to be configured during the design of the communication application. These properties and their values determine the behavior of the task node at execution time. To illustrate the nature of the communication nodes, the alert node and the voice conference node are discussed hereinafter. Similar designs exist for communication nodes, such as presence, IM conference and adding people to an existing conference.

The function of an alert node is to send a message to one or more users. While the underlying communication manager 150 and the communication switches may have separate components for media-specific alerts, such as an email message, an IM message or a voice message, the task node for the alert presents a unified view of an alert to provide a level of abstraction intended to facilitate the easy development of communication applications. The goal is to present unified views of communication capabilities that may be implemented in different ways on different servers. Some of the properties of the alert node include recipients (user application entities); message and its importance; any application context for message (other application entities, e.g. the customer's name and information in the claim resolution flow 210 in FIG. 2 may be sent as part of the message); time for delivery of message; whether presence can be used for delivery of message (optional); choice of media (email/IM/voice) for delivery of message (optional); and timeout for checking for responses to message.

If presence is to be used for the delivery of a message, the alert task node queries the entity relationship model in the underlying communication manager 150 for presence information relating to each of the recipients and accordingly selects the media for delivery of the message. If both presence and a specific media are not chosen for the delivery of the message, the alert node defaults to using the user contact preferences for each of the users.

The message of an alert node may be a dialog script if the alert is delivered using a voice connection or a web-based response template if the alert is delivered over IM or email. Responses to the alert are collected by the underlying communication manager 150 and can be accessed by the task nodes in the flow layer 110.

The function of the voice conference node is to set up a voice conference among a group of people. Some of the properties of this node include conference application entity; name of conference; invitees to conference; start time for conference; and message and application context to be heard at start of conference User Management Users are a critical part of any communication application and the goal of any communication application is to enable a rich user experience. User data is typically stored in a directory-based structure and accessed through a protocol such as LDAP. User directories allow the storage of communication attributes for a user such as a unique handle, telephone number, email and IM addresses. Role-based attributes that show the skill of a user are particularly important so that role-based searches can be done and people with the right skills can be quickly contacted to resolve critical issues, for example, using the data mining techniques discussed further below in conjunction with FIGS. 5-9. Additionally, user preferences that indicate, for each user, the best way to contact the user at a given time are extremely useful in ensuring a smooth communication experience. Typically, an enterprise stores this type of information in directories. The entity relationship model either incorporates this information by copying it or accesses the appropriate directories on demand without copying the information.

Communication Management Layer

In the exemplary embodiment, the communication management layer 150 encompasses several J2EE components and some peripheral Java 2.0 Standard Edition (J2SE) components. The communication management layer 150 can be implemented as an extension of J2EE and can maximize the number of services performed by J2EE on behalf of the communication application development and execution platform 100.

API to Flow Management Layer

Figure 4:
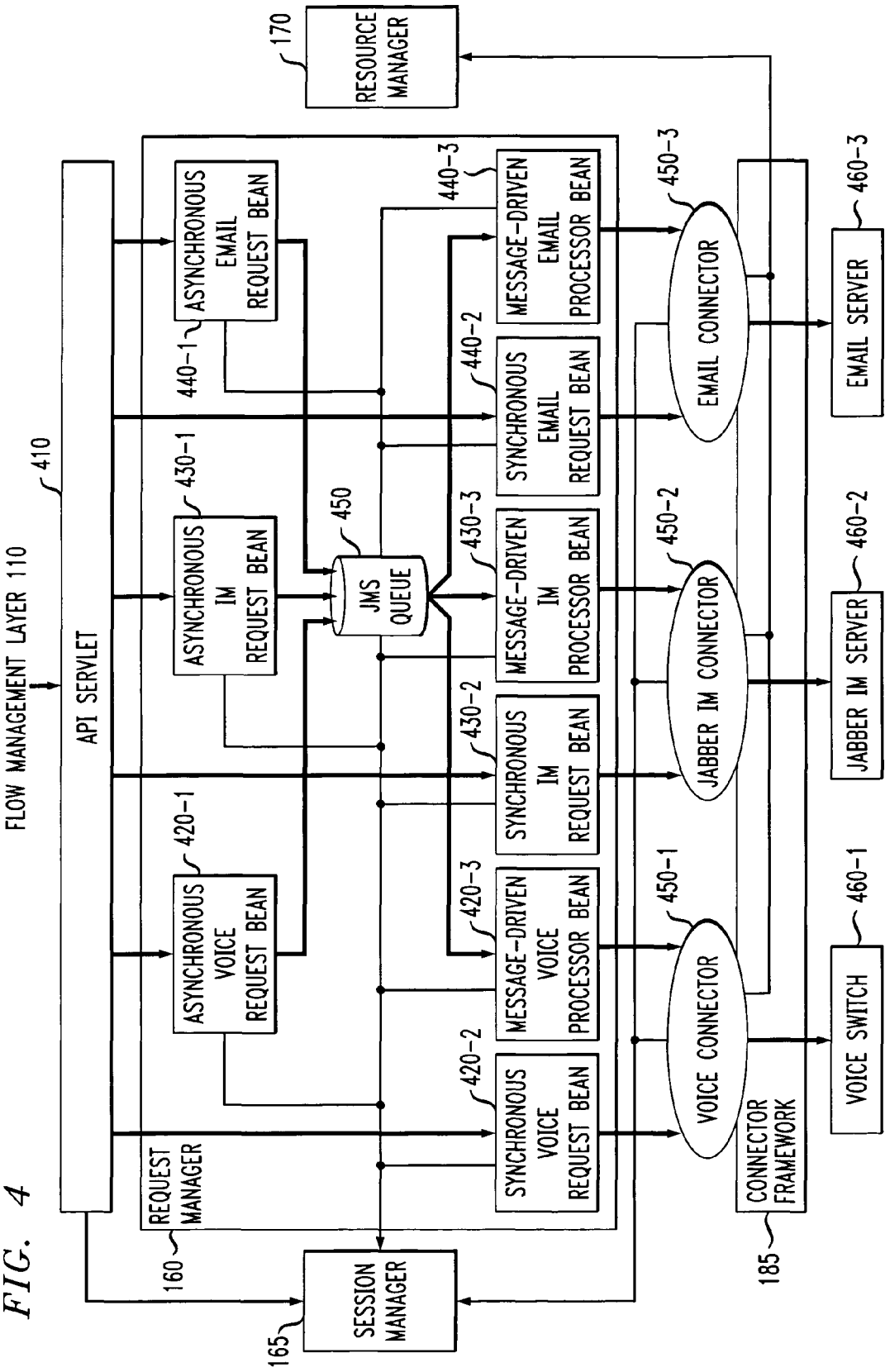
FIG. 4 is a schematic block diagram illustrating the interaction of the various components of the communication management layer of FIG. 1 in further detail.

FIG. 4 is a schematic block diagram illustrating the interaction of the various components of the communication management layer 150 of FIG. 1 in further detail. As shown in FIG. 4, the Communication Manager 150 offers an API 410 to the flow management layer 110 that can be implemented by a servlet. This API servlet 410 classifies the request either as a communication request or a request for entity relationship information and checks the request for syntactic and semantic validity. The servlet 410 hands over valid communication requests to the request manager 160 and all other valid requests to the entity relationship manager 165. For each valid request, the servlet 410 starts a J2EE UserTransaction that envelops all operations pertaining to this request. Eventually, the servlet 410 commits the UserTransaction or rolls it back in the case of an exception or a transaction timeout.

The illustrative communication application development and execution platform 100 thus delegates concurrency control to J2EE. Since J2EE currently does not permit the use of timers, the communication application development and execution platform 100 uses the UserTransaction and its timeout settings to also bound the time that a communication request spends waiting for fulfillment from the underlying communication infrastructure.

Request Manager

As shown in FIG. 4, the request manager 160 ties all other components in the communication manager 150 together. The request manager 160 contains three subcomponents voice requests 420, instant messaging requests 430, and email requests 440, respectively. The three subcomponents strongly resemble each other but accommodate different request parameters as required by the different media. Each subcomponent 420, 430, 440 has a synchronous, asynchronous and message-driven incarnation. All synchronous subcomponents perform the following operations:

1 acquisition of Enterprise Java Bean (EJB) resources (home and, in some cases, bean interfaces) used during communication operations;

2 creation of sessions for communication operations;

3 acquisition of the appropriate connectors for the communication operations. Connectors are part of the Connector Framework, as discussed below;

4 invocation of media-specific operations on connector objects. The connector objects reference media-specific resources offered by the resource manager 170 and perform the translation from abstract requests for communication operations into concrete operations on the underlying communication infrastructure; and 5 logging of requests and results.

The asynchronous subcomponents extend this list with creating Java Messaging Services (JMS) messages that encapsulate requests and depositing such messages in a JMS queue 450; and retrieving requests from the JMS queue 450 and executing the requests, i.e., invoking media-specific operations on connector objects as in the synchronous case.

The retrieval of requests from JMS queues 450 is performed by message-driven beans 420-3, 430-3, 440-3 All other tasks on the list are implemented as stateless session beans. The strong commonalities among the subcomponents allowed a set of common abstract J2SE classes to be built that the subcomponents extend into the concrete bean classes of stateless session beans and message-driven beans. Notice that J2EE does not define the notion of bean inheritance and that therefore the employed inheritance hierarchy is on a per-class base, i.e, traditional J2SE inheritance.

Entity Relationship Manager

In the exemplary implementation of the communication application development and execution platform 100, a session is a single object. More specifically, it is an entity bean with container-managed persistence, so data persistence and distribution across servers in a clustered version of the communication application development and execution platform 100 is offloaded to J2EE. A session contains fields for the media type of the session (e.g., "voice conference"), the session name, a unique session ID, the session creation time as well as the session expiration time, and a hashtable that stores media-specific data such as the name of the VXML script to be rendered in the case of a first-party voice call or the conference name of an instant messaging conference. Users and their properties (phone numbers, instant messaging addresses, email addresses, etc.), endpoints (representing communication devices), activities, expertise, locations, projects are represented as entity beans with container-managed persistence as well. Sessions have relationships with users through endpoints because users are invited to sessions or currently participate in sessions and do so via a communication device. The relationship management is accomplished via the J2EE concept of container-managed relationships between the entities in the entity relationship model.

The API 410 that the communication management layer offers to the flow management layer contains complex queries on the relationship model. These queries are specified as part of the entity relationship manager but implemented by J2EE. Adding new queries thus is a very simple process, involving mostly configuration changes, that does not depend on the database used for storing the data that the entity relationship model holds.

As the connections between the entity relationship manager 165 and other components in the communication manager 150 in FIG. 4 indicates, the entity relationship manager 165 is a pivotal information repository. The session and relationship manager 165 receives data from the synchronous and asynchronous subcomponents of the request manager 160 that set up communication operations, disseminates data to the message-driven beans in the request manager 160 as well as the media-specific connectors in the connector framework, is queried by the API servlet 410, and stores many relevant events that the Event Manager collects from the underlying communication infrastructure (not shown in FIG. 4) and from external servers, services, devices, systems, and applications. Examples of such events are Jabber IM presence changes, conferees joining a voice conference or dropping off of a conference, and data gathered from users during interactive VXML script execution. The personal voice agents described below access entity relationship information directly without using the communication manager API 410.

Because J2EE does not allow the use of J2SE timers, a dedicated external J2SE program in the form of a J2EE application client performs periodic cleanup operations on the existing sessions and other entities. The cleanup is necessary in cases where participants of sessions leave sessions but software or hardware failures cause the relevant events to not get propagated to the entity relationship manager 165. For example, if the voice switch fails during an ongoing voice conference, the conferees will get disconnected but the entity relationship manager 165 will not get notified of the disconnect due to the switch failure.

Resource Manager

The resource manager 170 contains a set of components that are geared towards the specifics of the underlying communication infrastructure and that allow the communication application development and execution platform 100 to access the servers in that infrastructure. Access to the voice switch and the Jabber IM server may require components in the resource manager 170. Generally, the resource manager 170 has the following properties:

For access to Internet Message Access Protocol (IMAPI) email servers, the communication application development and execution platform 100 can leverage the JavaMail capabilities that are built into J2EE and therefore does not require any additional resource management.

Wherever possible, the communication application development and execution platform 100 tracks resources in the underlying communication infrastructure such as voice switch ports by mapping these resources to entity beans. This allows the communication application development and execution platform 100 to persist the state of resource objects, to make them easily distributable across servers in a clustered version of the communication application development and execution platform 100, and allows complex queries on the set of available resources with little coding effort in the communication application development and execution platform 100.

The communication application development and execution platform 100 acts as a Jabber IM client when accessing a Jabber IM server. An existing J2SE client-side Jabber IM library can be used to implement the protocol between the communication application development and execution platform 100 and a Jabber IM server. This library, however, is multi-threaded and thus cannot be absorbed into J2EE. When it is necessary to integrate with legacy code, a J2SE proxy server can accommodate the legacy code.

Media Enhancements and Event Manager

Generally, the media enhancements 175 and the event manager 180 are media-specific. It is noted, however, that the event manager 180 is comprised of a set of servlets that can be invoked by components in the underlying communication infrastructure. These servlets access certain beans in the communication manager 150, in particular, the beans of the entity relationship manager 165. The use of servlets is a natural fit for the event manager 180 because the current components in the underlying communication infrastructure that can report events to other systems have the ability to act as HTTP clients.

Connector Framework

To facilitate the addition of voice switches 460-1, instant messaging servers 460-2, and email servers 460-3 (collectively, communication servers 460) to the communication application development and execution platform 100, the connector framework 185 defines interfaces for J2SE classes 450-1 through 450-3 (connectors 450) that perform the translation from abstract service requests into concrete instructions for the communication servers. An example of an abstract service request for the voice connector is "place a call," with given parameters, whereas the sequence of concrete instructions in the voice connector implements the actual protocol to the voice switch that eventually places the call. Connectors can access additional resources in the resource manager 170. Such resource objects need to be tailored to the communication servers.

If the capabilities of a new communication server do not exceed those anticipated in the design of the request manager 160 or if new capabilities are present but need not be propagated to the flow management layer 110, adding the new communication server to the communication application development and execution platform 100 is a straightforward process. It consists of building the appropriate J2SE connector class according to the J2SE interface that the communication framework 185 contains, and additional resource classes if necessary. The communication framework 185 plus the resource manager 160 thus act as an abstraction layer that localizes communication server-specific code in the communication application development and execution platform 100.

Detailed Features

Media, Protocols, and Communications Operations

The exemplary implementation of the communication application development and execution platform 100 supports three communication media and protocols: voice using a proprietary protocol for a voice switch, instant messaging using Jabber IM, and email using IMAPI. The workflow programming interface offers the following communication operations:

Voice: placing first-party calls to sets of phone numbers with rendition of specified and interactive VXML scripts; placing third-party calls; setting up voice conferences with designated voice greetings and personal voice agents for conferees;

Instant messaging: sending instant messages to sets of recipients and setting up instant message conferences;

Email: sending emails to sets of recipients with the option of including attachments.

The present invention defines a framework with Java interfaces that enables developers (or an administrators) to add new communication servers implementing these three media with different protocols. To add a communication server with a different protocol, a specific Java interface must be implemented and the communication application development and execution platform 100 must be recompiled, reconfigured, and restarted. This framework is extensible so that developers (or an administrators) can add communication servers implementing different communication media such as SIP, SMS, WAP or fax.

Abstraction, Integration and Convergence

The details of the protocols that are used to communicate with external servers 195, such as presence, availability and location servers, can be hidden from the applications. The level of programming abstraction can be elevated from dealing with, for example, ports on a voice switch or connection establishment with an instant messaging server to high-level tasks such as conference or IM message that developers connect with each other in flows. The flow programming interface incorporates all operations on the underlying media and on the components of the communication application development and execution platform 100 in one integrated environment.

Convergence of disparate media is accomplished through several features. For example, a user participating in a voice call can choose to have email and instant messages automatically rerouted to the call. When an email or instant message arrives for this user, he or she will be notified through a sound on the call and then the subject line of the message will be read to the user. Both the signal and the subject line rendition are audible only to the recipient. The communication application development and execution platform 100 introduces the notion of converged presence, which spans both instant messaging and voice calls. Thus, applications can query the presence status of a user and find out whether a given set of users is currently participating in an instant messaging or voice conference or in a voice call or have indicated that they are available to receive instant messages. Another example of convergence is the ability to access the entity relationship during an initiated voice conference, which allows a conferee to learn, for example, about the identities, and locations of other conferees, and the duration of the conference when the user joins.

Media Enhancements

The functionality of tasks is not necessarily backed by native capabilities of the underlying communication infrastructure. As a middleware platform, the communication application development and execution platform 100 can expand a task into an arbitrary set of operations on its own components and those of the underlying communication servers and thus offer more complex and more application-oriented media operations than what the underlying communication infrastructure implements. The convergence features described herein are examples of enhancements to the media functionality of the underlying communication infrastructure. Another example of media enhancements is the voice conferencing functionality that is not natively offered by the voice switch.

The personal voice agent is an example of media enhancements. It is a VXML program that can be injected into every call and voice conference established by the communication application development and execution platform 100. This VXML program can be configurable to incorporate application-specific and user-selected functionality. Generally, the personal voice agent speaks a configurable greeting to a conferee upon joining a conference. It stays silent on a call until one of two events occurs:

1. The user invokes the personal voice agent through pressing a key on a phone.

2. A message has been sent to the user as part of the execution of a flow by the communication application development and execution platform 100.

In the first case, the user is presented with a voice menu, only audible to this user, that gives access to the entity relationship model, in particular, to user data and allows retrieval of information about the other conferees or parties of a call such as the current number of conferees or parties, their identities, and their locations. Moreover, the personal voice agent allows the user to change settings that are in effect only for the duration of the call and that have relevance to the call. An example is the rerouting of text messages destined for the user to this call. The second case above refers to the ability of the communication application development and execution platform 100 to send an alert to a user on a call initiated by the communication application development and execution platform 100. The alert translates either into a signal tone that the user will hear or the voice rendition of the text of the alert, depending on the preferences of the sending flow and the recipient. In the former case, the recipient has the option of invoking the personal voice agent at any time and retrieving the alert text then.

Synchronous and Asynchronous Request Management

The communication application development and execution platform 100 processes requests for media operations, such as call setup requests, either in a synchronous or in an asynchronous fashion. The synchronous mode is appropriate when mostly requests with short-term interactions with the underlying media are expected. In the asynchronous mode, all requests are queued up before processing occurs. Requests are transacted in the communication application development and execution platform 100. Thus, each request, synchronous or asynchronous, will be processed to completion once and exactly once, even across restarts of the communication application development and execution platform 100. In other words, no request will get lost and requests do not get duplicated even in the event of a server outage. However, if, during partial processing of a request, communication with the outside world has taken place before a restart, this communication will be repeated after the restart.

A flow issuing either a synchronous or asynchronous request always receives a session handle from the communication application development and execution platform 100 in response to the request. The session handle identifies the request and allows the flow to track the status of the user interactions resulting from the request. For example, when a flow requests the establishment of an instant message conference, it can later check, for example, which user is currently participating in the conference, how long the conference has been in progress, and whether it has terminated.

The communication application development and execution platform 100 is extensible for cases where a flow application requires feedback after the completion of an asynchronous request. To this end, the communication application development and execution platform 100 offers a Java interface that can be implemented by an application designer. After completion of an asynchronous request, the communication application development and execution platform 100 calls a method in the implementation class and passes details about the request processing to this method.

Communication Resource Management

Certain media operations and, in particular, media enhancements 175 require management of certain media resources outside the underlying communication infrastructure. To enable conferencing, for example, the communication application development and execution platform 100 administers port and port assignment objects that reflect the supported and currently available ports, respectively, on the voice switch that it uses for placing conference call legs. The port assignment object for a given switch changes its state every time a call is placed and every time a conferee drops out of a conference call. Before setting up voice calls, the communication application development and execution platform 100 selects from the ports that are supported by the voice switch but are not part of the currently assigned ports. In the requests for call setup to the voice switch, the communication application development and execution platform 100 needs to include the addresses of the selected ports. Conference establishment works similar but, in a second step, the communication application development and execution platform 100 instructs the switch to connect to one another the ports that carry the voice legs of the conference.

The technology that enables on-call alerts and rerouting of text messages to phones as explained above is called shared voice channels. Shared voice channels allow voice calls to be shared between phones and flows that want to send alerts to users or render text messages over established calls. A shared voice channel is a resource administered by the communication application development and execution platform 100. Among the administrative duties are establishment of shared voice channels, request routing to the appropriate shared voice channels, multiplexing their use among requesters, and connecting them to the personal voice agents of users.

Another example of a communication resource managed by the communication application development and execution platform 100 is an instant messaging client. The communication application development and execution platform 100 connects to an instant messaging server as a programmatic client that establishes a link to a Jabber server. This client initiates all instant messaging operations, such as sending instant messages, instant messaging conference establishment, and requesting instant messaging presence information. This client contains an event listener that receives notifications from the Jabber server about presence status changes for instant messaging users.

Session and Relationship Management

When the flow engine 120 requests a high-level communication operation, the communication application development and execution platform 100 creates a session object that carries parameters for the operation to various components in the communication application development and execution platform 100. Some of the parameters eventually become part of the sequence of requests to the underlying communication infrastructure that ultimately implement the high-level communication operation. Examples of sessions are voice calls and instant message conferences. Examples of parameters for, say, a voice conference session are the ports on the voice switch that carry the conference calls, the configured voice greeting for conferees, the users invited to participate in this conference (invitees), the name of the conference and its setup time.

A session, however, not only stores static data pertinent to a communication operation but also dynamic data that flows may be interested in and can check for when querying the session object. Examples of such events are the current participants of a voice conference (active users). The set of active users is a subset of the set of invitees. Other examples are the termination time of a call or the feedback that a first-party call with an interactive VXML script gathered from a user. Thus, the communication application development and execution platform 100 not only initiates session objects with data but also collects dynamic data and propagates it to session objects.

The workflow programming interface contains predefined queries but for ad hoc queries flows can bypass the programming interface and execute the queries directly on the database representations of the entity relationship model. The entity relationship management directly supports complex reasoning about which user to communicate with, how, and when. An example of taking advantage of information presented by the entity relationship management is the determination that a specific user happens to be on a voice call initiated by the communication application development and execution platform 100 and the subsequent use of the shared voice channel feature to communicate with that user. An example of a more complex query supported by the entity relationship model would be "find all users who are currently not engaged in any activity and have expertise x and were part of the voice conference named y".

Currently, sessions are aligned with communication operations of potentially non-zero duration supported by the underlying communication infrastructure. However, flows could delineate sessions as well. This would enable flows to treat complex communications operations as objects of reasoning. An example of such a session would be sending out conference invitations to users via a variety of media, followed by the conference itself, followed by a post-conference email to all conference participants. This generalized notion of sessions would also allow navigable hierarchies of sessions.

Data Mining within Communication Session Information

Entity Relationship Management

Whenever the communication application development and execution platform 100 receives a communication request from an application (a flow), it records the request and its detailed result status (e.g., request successfully executed, with timestamp and details of the request). The record is written to a database using J2EE services. Records of this type are primarily for reporting and auditing purposes but could also be used for purposes of data mining, according to one aspect of the present invention. A record is a row in a database table with columns for the date and time of the request fulfillment, the name and address of the device for which the request was destined, the user endpoint address(es) that the request referred to (such as telephone numbers), an identifier for the request, and a detailed result status (such as "email successfully sent" or "voice call request failed due to switch failure").

The communication application development and execution platform 100 distinguishes between two types of communication requests. The first type establishes a new session. An example of this type is setting up a conference call. A session is both an identifier for the communication request as well as a collection of data pertaining to the request and to the execution of the request including user input (key presses, user responses to VXML scripts, etc.). The second type of communication request explicitly refers to an existing session and modifies the session. Modifications are the addition or deletion of users to and from sessions, respectively. For example, adding a user to an ongoing conference is an addition of a user to a session, whereas a request for dropping a user from an ongoing conference is a deletion of the user from the session.

When a user has been added to a session, either a newly established session or an ongoing session, the user is not automatically participating in the session but is rather invited. Participation is effected by the user actually joining the session, for example, being bridged into a conference. Once the user leaves the session, the user has participated in the session and remains in that state indefinitely unless the user is re-invited to the session or participates without prior invitation.

Figure 5:
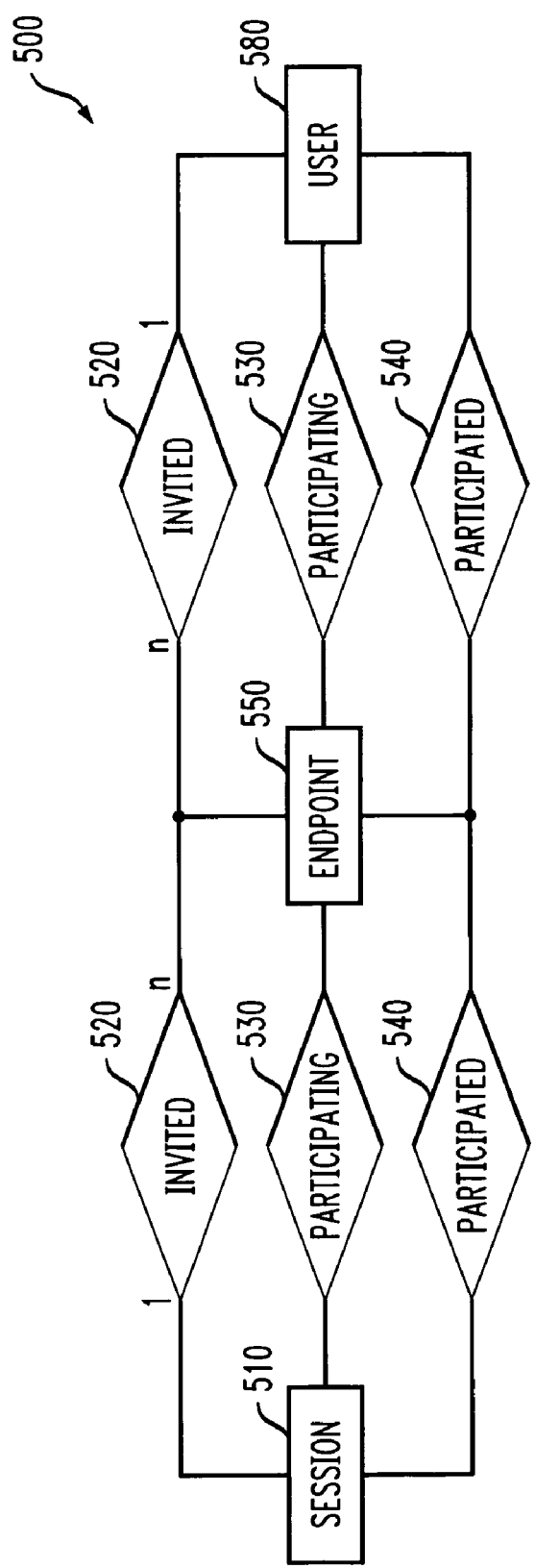
FIGS. 5 and 6 illustrate an entity relationship model incorporating features of the present invention.

FIG. 5 illustrates an entity relationship model 500 incorporating features of the present invention. As shown in FIG. 5, there are three possible relationships between users 580 and sessions 510: invited 520, participating 530, and participated 540 Since users get invited to a session or participate in a session using a particular device (such as telephone, Web browser or IM client), these three relationships can be amended by endpoint information, thus leading to the entity relationship model 500 shown in FIG. 5

The entity relationship manager 165 implements the entity relationship model 500 of FIG. 5. In one exemplary implementation of the communication application development and execution platform 100, each entity is represented as a J2EE entity Enterprise Java Bea (EJB) that stores all entities of this kind in a database table, with one row for each concrete entity (session 510, endpoint 550, user 580, respectively) and columns for the fields (attributes) of the entity.

The exemplary attributes for a user entity 580 include user identifier; user statistics (such as name and address); endpoint addresses (such as telephone numbers, IM addresses and email addresses); and media options (media preferences that can be changed dynamically).

The exemplary attributes for an endpoint entity 550 include endpoint name; endpoint address (e.g., telephone number or IM address); endpoint location (last observed if mobile endpoint); and last used timestamp. The exemplary attributes for a session entity 510 include session identifier; session name; media type; creation time; expiration time; session data (e.g., responses from users, or setup data for communications subsystem); and an indication of whether the session has been used (boolean variable, used to determine whether session has terminated after previous use by users).

External Sessions

The communication application development and execution platform 100 can also maintain a notion of external sessions that are set up outside of the communication application development and execution platform 100, e.g., by users or external communication systems and devices. An example is users turning on and off their cell telephones. The time intervals between the on and off events are external sessions. If cell telephones or their providers propagate these events to the communication application development and execution platform 100, the communication application development and execution platform 100 can establish external sessions for cell telephone users. If cell telephones or their providers can also propagate button pushes from cell telephones to the communication application development and execution platform 100, the communication application development and execution platform 100 can store that information as last used timestamp in the corresponding endpoint object. (Rather than propagating every button push, however, the device could propagate a button push if no other button push has occurred in the preceding time interval of a configurable length.)

Depending on the type of endpoint, the communication application development and execution platform 100 records different types of last used timestamps. For telephone calls and conference calls, as well as instant messaging conferences originating at, controlled by, or monitored by the communication application development and execution platform 100, the beginning and end of the call/conference can be recorded as last used. For messaging media, the last time a message was received and opened by the user can be recorded. For other types of media, on/off events or button pushes can be recorded.

This type of session management allows not only an up-to-date view of users' presence on various endpoints and in various ongoing sessions but also a prediction of users' presence (fuzzy presence). If a user participates in a session through an endpoint, there is a certain likelihood that the user is present on this endpoint. The actual likelihood varies with the time that the corresponding endpoint was last used and the type of endpoint. If a user is not known to be participating in any session but has participated in a session, the likelihood of the user's continued presence at or near the corresponding endpoint can be computed given a probability function that takes into consideration the type of endpoint, its location, and the time it was last used as part of the session.

Incorporating Additional Information About Users

Beyond receiving external session information from connected systems and devices, the entity relationship manager 165 could incorporate many other types of information from systems and devices that the communication application development and execution platform 100 either polls regularly or that propagate events automatically to the communication application development and execution platform 100 after an initial event subscription request. For example, the communication application development and execution platform 100 can obtain location information for people and endpoints; availability information ("user is not only present but also ready to do something such as receive calls or participate in select activities."); and activity updates ("user has just started participating or ended participation in an activity or project"), especially for activities that are related to the user's functions in the enterprise.

Figure 6:
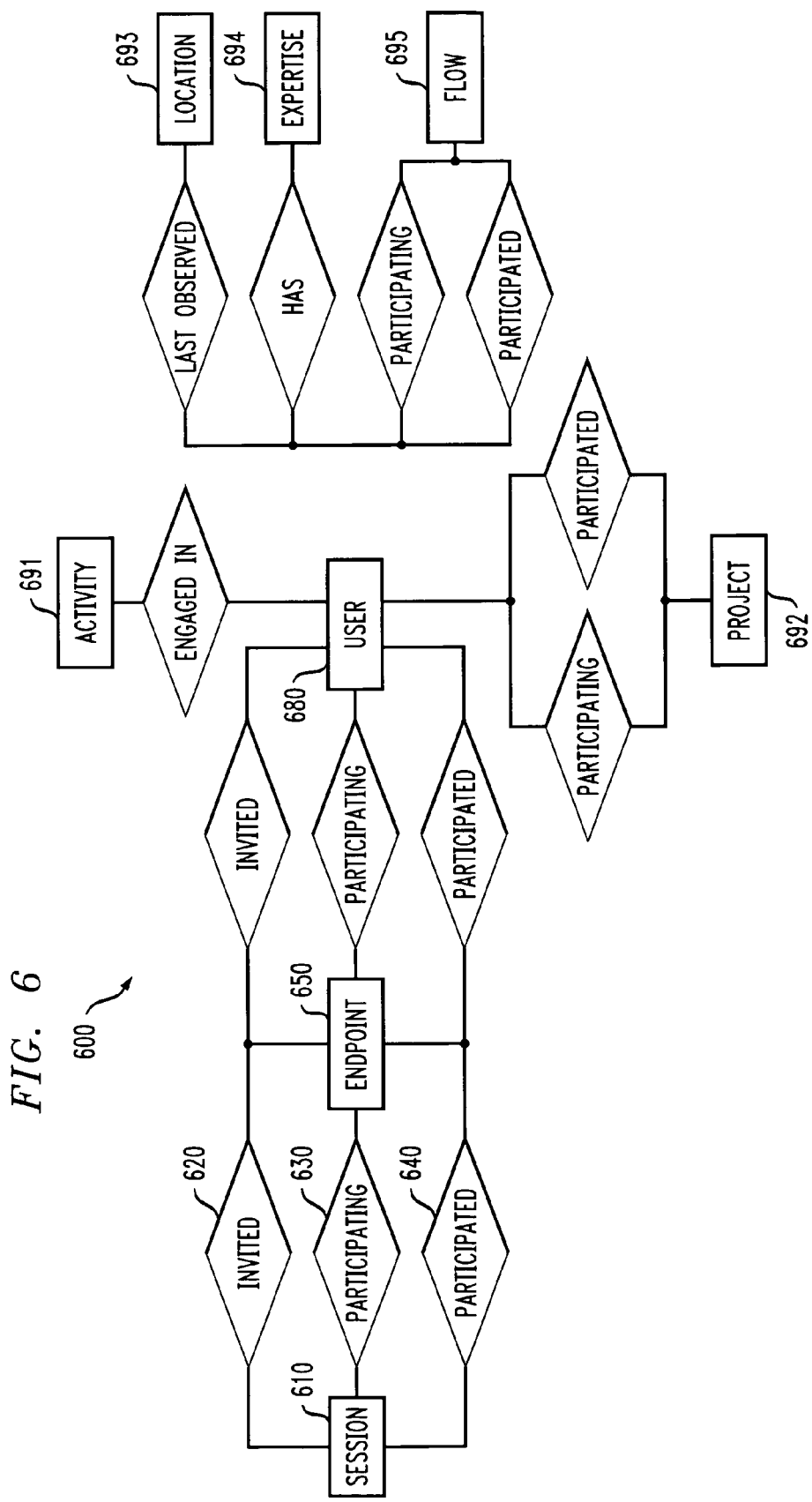

From directories, the communication application development and execution platform 100 could draw in static information about a user's skill set and expertise. The communication application development and execution platform 100 could also record the flows (applications) that users participate in and have participated in. This gives rise to an extended entity relationship model 600, an example of which is shown in FIG. 6 (as in FIG. 5, the ary-ness of the relationships [1:1, 1:n, m:n] is not shown):

FIG. 6 illustrates the extended entity relationship model 600 incorporating features of the present invention. As in FIG. 5, there are three possible relationships between entities: invited 620, participating 630, and participated 640. The extended entity relationship model 600 extends the entity relationship model 500 of FIG. 5 to include activity, project, location, expertise and flow entities 691 through 695, respectively.

The activity, project and expertise entities 691, 692 694, for example, can be filled with data by the equivalent of an Internet search engine, as discussed further below in conjunction with FIG. 7. Generally, the activity search engine 700 roams a specific domain, such as the corporate Intranet, for information related to this user's activities in the past and at present. The activity search engine 700 looks for, e.g., documents, software code and forms, bearing the user's authorship and documents referencing the user. From these objects, the activity search engine 700 culls key words that describe the object and its relation to the user, in much the same way as an Internet search engine does it. The activity search engine 700 can perform a continuous or periodic search for users' activities.

Whenever the activity search engine 700 has found a user's activity, the activity search engine 700 would feed this information into the activity entity 691. The information that the activity search engine 700 finds can also be fed into an application that would ask the identified users whether they would like this information to go into the information database or not and whether they would like to refine or modify the found information, as discussed further below in conjunction with FIG. 8.

Figure 7:
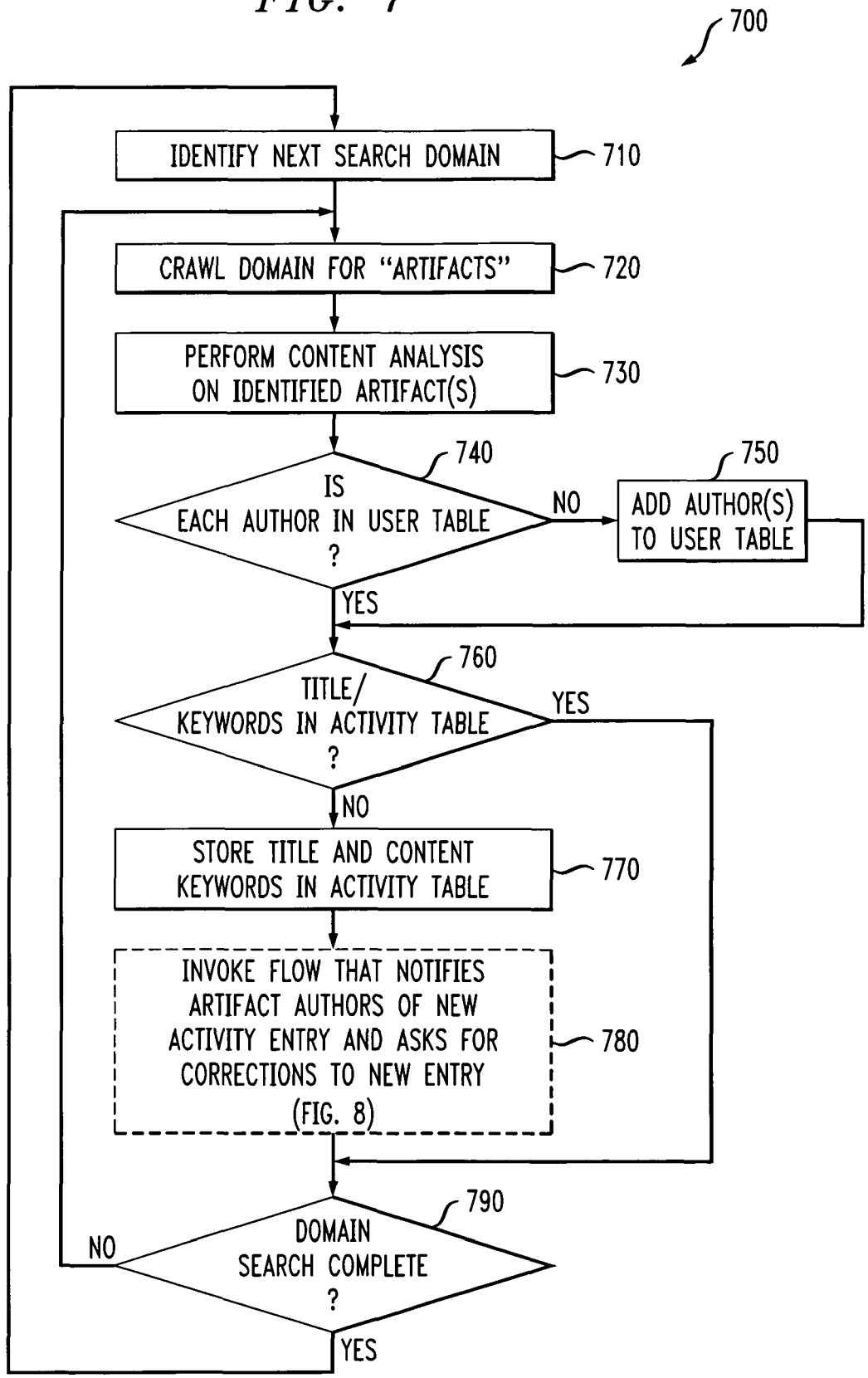
FIG. 7 is a flow chart describing an exemplary implementation of the activity search engine.

FIG. 7 is a flow chart describing an exemplary implementation of the activity search engine 700. Generally, the activity search engine 700 roams a specific domain, such as the corporate Intranet, for information related to this user's activities in the past and at present. As shown in FIG. 7, the activity search engine 700 initially identifies the next search domain in the activity search engine 700 configuration during step 710. The configuration information defines the domains that should be targeted to search for information, such as the corporate intranet or portions thereof. Thereafter, Internet search techniques are performed during step 720 to crawl the identified domain for, e.g., Web pages, documents, source code, and patents, (collectively, referred to as "artifacts").

Once an artifact is found during step 730, content analysis techniques are performed to identify, for example, names of the authors, title, name, and content keywords of the artifact. A test is then performed during step 740 to determine if each author is represented in the user table. If it is determined during step 740 that each author is not represented in the user table, then the appropriate user entries are created during step 750.

If, however, it is determined during step 740 that each author is represented in the user table, then a further test is performed during step 760 to determine if the title and keywords of the artifact are already present as a row in the activity table. If it is determined during step 760 that the title and keywords of the artifact are already present in the activity table, then program control proceeds to step 790. If, however, it is determined during step 760 that the title and keywords of the artifact are not present in the activity table, then the title and content keywords of the artifact are stored during step 770 in a new row for each author in the activity table (optionally, marked as temporary and validated in accordance with the technique discussed further below in conjunction with FIG. 8). Thus, the information is stored during step 770 in the entity relationship model described above.

Figure 8:
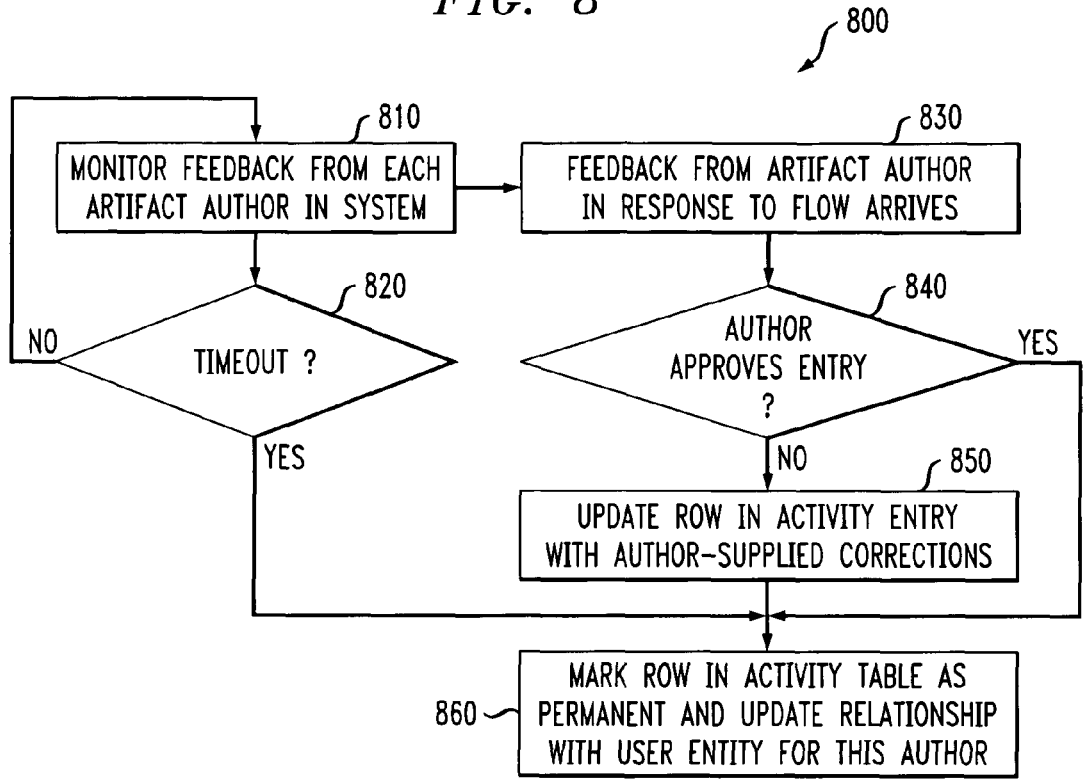
FIG. 8 is a flow chart describing an exemplary activity entry approval process.

A flow is optionally initiated during step 780 that notifies the artifact authors of the new Activity entry and requests corrections to the new entry (see FIG. 8). A further test is performed during step 790 to determine if the search of the current domain is complete. If it is determined during step 790 that the search of the current domain is not complete, then program control returns to step 720 and continues in the manner described above.

Once it is determined during step 790 that the search of the current domain is complete, then program control proceeds to step 710 to identify the next domain.

FIG. 8 is a flow chart describing an exemplary activity entry approval process 800. Generally, the activity entry verification process 800 allows a user to approve the activity information identified by the activity search engine 700. As shown in FIG. 8, the activity entry approval process 800 initially monitors for feedback during step 810 from each artifact author that received the flows that were initiated by the activity search engine 700 during step 780 (FIG. 7). The activity entry approval process 800 monitors for a timeout condition during step 820.

Meanwhile, if feedback is received from an artifact author in response to the flow during step 830, then the feedback is evaluated during step 840 to determine if the author approved the activity entry. If it is determined during step 840 that the author has any corrections to the entry, then the activity entry is updated during step 850 with the author-supplied corrections. Thereafter, the row in the activity table is marked as permanent and the relationship with the user entity is updated for this author during step 860.

Data-Mining Stored Information for Intelligent Communication

The entity relationship model 500, 600 discussed herein supports data mining and reasoning processes that can aid in making better, faster, more precise communication decisions and can aid in detecting patterns in communications. The entity relationship model 500, 600 not only stores attributes of entities but, equally importantly, the current relationship between two entities, allowing better communications decisions. Notice also that once data in the entity relationship model 500 becomes stale it can be written to a historical database, which allows more data mining based on historical data about entities and their relationships with each other.

In one implementation, the communication application development and execution platform 100 makes the following exemplary communications decisions based on the entity relationship model:

the set of people who need to be contacted at a given time to solve a certain problem;

the modalities with which to contact these people (IM, telephone, email, SMS, Web or fax);

the most appropriate endpoint with which to contact these people (for example, selecting one of several telephone devices associated with a user or if it is known, for example, that one such person is currently on a telephone call, a message can be injected into the ongoing telephone call to this person); and the content of the communication (what the systems ought to convey to the identified set of people, for example, what kind of message to send or what kind of conference title to choose).

In contrast to the much simpler and widespread use of role resolution to identify people and the use of static rules to route communication requests to people, the present invention makes communications decisions based on a large spectrum of dynamic, static, and historical data about entities as well as fine-grained relationships between such entities. The use of relationships, such as invited 520, participating 530, participated 540, historical data and entities, such as endpoints, allows communications decisions to be made using known facts about users, as well as facts that are not known by predicting, based on historical data, information about a user, such as presence, availability, location or most appropriate modality.

An example is the aforementioned fuzzy presence. Very often, the presence status of a given user cannot be ascertained but a presence status from a short while ago may be available. If there is a session in which this user participated with a certain endpoint, the communication application development and execution platform 100 knows when the user last used this endpoint and can make a prediction of the user's current presence status at this endpoint. By computing and comparing all predictions of this kind, the communication application development and execution platform 100 can, during the reasoning process, come up with a list of presence predictions for this user, sorted by probability and when asked for routing a communications request to this user, go down this list sequentially and thus, e.g., automatically first try to reach this user on his IM client, then his cell telephone, then his PDA email and then his office telephone.

Figure 9:
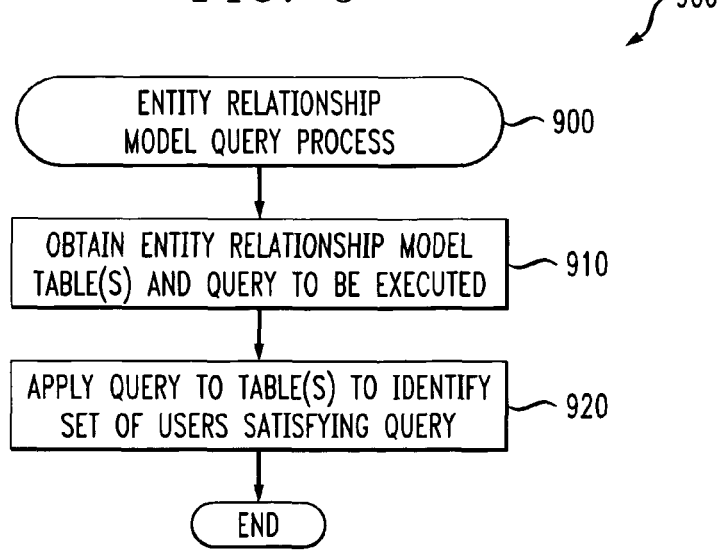
FIG. 9 is a flow chart describing an exemplary entity relationship model query process.

FIG. 9 is a flow chart describing an exemplary entity relationship model query process 900. Generally, the entity relationship model query process 900 allows the information stored in the entity relationship model 500 to be queried in arbitrarily complex ways. As shown in FIG. 9, the exemplary entity relationship model query process 900 initially accesses the tables in the entity relationship model 500 and obtains a query from a user or from a flow in the communication application development and execution platform 100 during step 910. Thereafter, the query is applied to the tables during step 920 to identify the set of users that satisfy the criteria specified in the query.

Examples of queries include:
- find all sessions in the last 90 days that were IM conferences pertaining to a product release;
- find all users who have expertise in and worked with a specific product and who are currently present;
- identify all activities that a certain department has been engaged in during the last 30 days;
- find all users in a specific location who have been invited to participate in a conference call about a certain product but have never actually participated in any of these conferences;
- identify the ten department heads in the enterprise closest to a certain address who are currently present or who have been present in the last ten minutes and who have expertise in a certain product;
- find all users in the enterprise who have never worked with the enterprise's flagship product; and
- find all present users within a given distance from the requestor and who have extensively worked with the enterprise's flagship product.

Once a set of users has been selected, communications with such users can be established. Identifying a set of users satisfying certain criteria by means of data mining the information in an entity relationship model and then communicating with the identified users in accordance with the present invention has a wide spectrum of possible applications. For example, the data mining techniques of the present invention can be applied in the following applications:
- contact centers;
- drawing experts into an ongoing conference call once a demand for additional expertise has been identified during the conference call;
- turning enterprises or subdivisions into virtual contact centers where each employee can be both an agent as well as a requester: if an employee needs to find somebody knowledgeable in a certain subject matter, the employee can ask the system to automatically establish communications with another employee who has been extensively engaged in activities related to the subject matter in the past or whose skill set matches the subject matter;
- trouble ticket/shooting systems: when a trouble ticket is being submitted or inquired about, the system can automatically establish communications between the submitter or the person who receives the trouble ticket and a set of people who have dealt with the same or similar tickets before; and
- reminder applications.

Data mining, especially based on historical data, can also be used in detecting patterns in communications and user activities for a large variety of purposes, such as:
- fraud detection;
- communication inefficiencies (bottlenecks) between people or between people and devices, media, and services;
- identification of users who exceed established communication thresholds; and
- trends in the use of communication devices, media, and services.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   roaming, by a server, a domain to locate a written material;
   identifying an author of the written material and a first keyword in the written material, wherein the author is identified by performing content analysis on the written material after the written material is found;
   when the author of the written material is not represented in a table, entering the author of the written material in the table and creating an association between the author of the written material and the first keyword, wherein the table relates authors to keywords that are found in written materials authored by the authors;

receiving a request from a first user to establish communications with a second user, wherein the request causes the server to select the author of the written material as the second user based on a probability measure of availability associated with at least one of an endpoint to contact the author, a type of the endpoint, and a time the endpoint was last used and based on a correspondence between the first keyword and a second keyword; and routing the request to the author of the written material.

2. The method of claim 1 wherein the first keyword is used in connecting the author of the written material with the first user only if the first keyword is approved by the author of the written material.

3. The method of claim 1 comprising selecting the endpoint to contact the author of the written material on, wherein the selecting is based on:
   (i) the location of the endpoint,
   (ii) the type of the endpoint, and
   (iii) the time when the endpoint was last used by the author of the written material.

4. The method of claim 1 wherein the written material is one of a web page, a document, a patent, a form, and a source code.

5. The method of claim 1 comprising refining the first keyword, wherein the refining comprises:
   (i) transmitting the first keyword to the author of the written material,
   (ii) receiving a correction from the author of the written material, and
   (iii) updating the first keyword with the correction.

6. The method of claim 1 wherein the server is a system that comprises a plurality of computers.

7. A method comprising:
   scanning a domain to locate a written material;
   identifying an author of the written material and a non-empty set of keywords from the written material;
   refining the non-empty set of keywords by:
     (i) transmitting the non-empty set of keywords to the author of the written material,
     (ii) receiving a correction from the author of the written material, and
     (iii) updating the non-empty set of keywords based on the correction;
   receiving a communication request from a first user to establish communications with a second user, wherein the first user requests the server selects the second user based on a first keyword and wherein the server selects the author of the written material as the second user based on a probability measure of availability associated with at least one of an endpoint to contact the author, a type of the endpoint and a time the endpoint was last used and based on a correspondence between the first keyword and a second keyword; and
   routing the request to the author of the written material.

8. The method of claim 7 wherein the domain is scanned periodically.

9. The method of claim 7 wherein the domain is scanned continuously.

10. The method of claim 7 comprising selecting, by the server, the endpoint to contact the author of the written material on, wherein the selecting is based on:
    (i) the location of the endpoint,
    (ii) the type of the endpoint, and
    (iii) the time the endpoint was last used by the author of the written material.

11. The method of claim 7 wherein the server is a system that comprises a plurality of computers.

12. A method comprising:
    scanning, by a server, a domain to locate a written material;
    identifying an author of the written material and a first keyword from the written material, wherein the author is identified by performing content analysis on the written material;
    receiving a request from a first user to establish communications with a second user, wherein the first user requests that the server selects the second user based on a second keyword and wherein the server selects the author of the written material as the second user based on a probability measure of availability associated with at least one of an endpoint to contact the author, a type of the endpoint and a time the endpoint was last used and based on a correspondence between the first keyword and the second keyword; and
    routing the request to the author of the written material to establish communications with the first user.

13. The method of claim 12, wherein the domain is scanned periodically by the server.

14. The method of claim 12, wherein the domain is scanned continuously by the server.

15. The method of claim 12, wherein the server comprises a plurality of computers.

16. A method comprising:
    identifying, by a server, an author of a content and a first keyword in the content, wherein the author is identified by performing an analysis on the content, wherein the server stores a table that relates authors to keywords found in the content;
    when the author of the content is not represented in the table, entering the author of the content in the table and creating an association between the author and the first keyword;
    receiving a request from a first user to establish communications with a second user that is selected based on a second keyword;
    selecting the author as the second user because of a correspondence between the first keyword and the second keyword;
    selecting an endpoint to contact the author based on a probability measure of availability that is associated with at least one of skill in the art a type of the endpoint and a time when the endpoint was last used by the author; and
    routing the request to the author of the content using the endpoint.

17. The method of claim 16, wherein the first keyword is used in connecting the author with the first user only if the first keyword is approved by the author.

18. The method of claim 16, wherein the content is one of:
    (i) a web page,
    (ii) document,
    (iii) patent,
    (iv) form, and
    (v) source code.

19. The method of claim 16, comprising refining the first keyword by:
    (i) transmitting the first keyword to the author;
    (ii) receiving a correction from the author; and
    (iii) updating the first keyword with the correction.

* * * * *

UNITED STATES PATENT AND TRADEMARK OFFICE
CERTIFICATE OF CORRECTION

PATENT NO. : 8,180,722 B2
APPLICATION NO. : 10/955917
DATED : May 15, 2012
INVENTOR(S) : John et al.

Page 1 of 1

It is certified that error appears in the above-identified patent and that said Letters Patent is hereby corrected as shown below:

In the Claims

Column 23, line 21, claim 3 and line 66, claim 10, "the location" should be changed to --a location--.

Column 24, line 47, claim 16, "skill in the art" should be changed to --an endpoint to contact the author,--.

Signed and Sealed this
Twenty-eighth Day of January, 2014

Michelle K. Lee
*Deputy Director of the United States Patent and Trademark Office*